United States Patent [19]

Glorioso

[11] Patent Number: 4,773,961

[45] Date of Patent: Sep. 27, 1988

[54] HANGER LABELING APPARATUS

[76] Inventor: Nicholas Glorioso, 161 E. 206th St., Bronx, N.Y. 10458

[21] Appl. No.: 6,114

[22] Filed: Jan. 23, 1987

[51] Int. Cl.[4] .................... B32B 31/00; B65H 26/00; A41D 27/22

[52] U.S. Cl. .................................. 156/361; 156/542; 156/249; 156/DIG. 6; 223/85

[58] Field of Search ........................... 223/85, 95, 98; 156/361, 539, 540, 541, 542, 584, DIG. 24, DIG. 26, DIG. 29, DIG. 33, DIG. 37, DIG. 42, DIG. 46, 354, 475, 497, 249, DIG. 6, DIG. 14, DIG. 23, DIG. 31

[56] References Cited

U.S. PATENT DOCUMENTS

| | | | |
|---|---|---|---|
| 3,944,455 | 3/1976 | French | 156/542 |
| 4,006,547 | 2/1977 | Samuels et al. | 223/85 |
| 4,115,179 | 9/1978 | Carter | 156/DIG. 42 |
| 4,120,740 | 10/1978 | Morgan et al. | 156/361 |
| 4,450,639 | 5/1984 | Duester | 223/85 |
| 4,561,921 | 12/1985 | Treiber | 156/542 |
| 4,561,923 | 12/1985 | Dehoreuzi et al. | 156/361 |
| 4,566,933 | 1/1986 | Craakshaw et al. | 156/DIG. 38 |

*Primary Examiner*—Michael W. Ball
*Assistant Examiner*—Louis Falasco
*Attorney, Agent, or Firm*—Anthony J. Casella; Gerald E. Hespos

[57] ABSTRACT

A labeling apparatus is provided for securing a label to a garment hanger. The labels are stored on a carrier tape in a cassette and are sequentially advanced to a pickup position in the apparatus. The apparatus includes an alignment frame against which the hanger is positioned. A clamp securely retains the hanger against the alignment frame. A tweezer assembly moves a label from the pickup position into alignment with a selected location on the hanger. A first applicator then urges a portion of the label into contact with the hanger. The tweezer assembly then releases its grip on the label and retracts, and a second applicator then urges the remainder of the label into the hanger. The applicators and the clamp are then retracted allowing the hanger to be removed from the apparatus.

5 Claims, 2 Drawing Sheets

HANGER LABELING APPARATUS

BACKGROUND OF THE INVENTION

Clothing manufacturers typically produce clothing garments in batches according to size. The manufacturers then affix one or more labels to each garment to identify the size and other pertinent data. Each clothing garment then is mounted on a separate hanger and shipped to an appropriate wholesale or retail facility. In many instances, the garments are relabeled with an appropriate size tag for the individual retail. Additionally, each retailer will often replace the original manufacturer's hanger with a hanger of its own.

The clothing distribution process briefly described above requires each garment to pass through several hands prior to reaching the retail rack. During each step of this distribution process, it is necessary for each garment to be sorted according to its size. The labels referred to above generally are affixed manually or with small hand held machines. The personnel handling the clothing garments generally are required to search for and identify the size tag to insure that the garments are properly sorted and to inventory items being sold.

The hangers on which individual garments are shipped, stored and displayed includes an elongated generally shoulder shaped support on which a garment is supported or an elongated bar having clips to which the garment may be releasably attached. A neck typically extends upwardly from the garment supporting portion. The neck typically terminates in a hook integral therewith, and dimensioned to be placed on or removed from a horizontal bar.

Some hangers are intended to receive a size tag thereon. For example, size tags have been adhesively attached to the garment supporting portion directly beneath the neck and hook portions of the hanger. Other hangers have included a separate size identifying collar to be engaged on the neck of the hanger between the hook and the garment supporting portion. The object of these prior art hangers has been to more clearly identify the size of the garment supported thereon, and thereby avoid the need to search over the garment itself for a size tag. Although this objective is desirable, the size indicia on the hanger often is not immediately visible to the consumer or retailer. Thus, the consumer or retailer must move the garments and hangers relative to one another in an effort to identify an appropriate size label. Additionally, the prior art has relied upon thet manual placement of the size labels or collars onto the appropriate hanger. This has added to the time and cost required to deliver the clothing articles to the retail floor. In this regard, it must be noted that the clothing industry is extremely competitive, and time and cost penalties generally cannot be tolerated.

Recently, hangers have been developed which include a panel for size labels on the hook portion of the hanger. More particularly, the panel for the size label will be disposed on the portion of the hook that will be nearest the consumer or retailer inspecting a rack of garments. Hangers of this type have been molded from plastic and the panel for the size label has been disposed at an acute angle with respect to the bar from which the hanger is suspended. The location and angular alignment of this panel is intended to make the size label thereon immediately visible to the consumer or retailer inspecting a rack of garments. One hanger of this type is shown in U.S. Pat. No. 4,450,639 which issued to Duester on May 29, 1984. Although hangers of this general type will facilitate the identification of a particular size, it has been relatively difficult and costly to place the size labels on the hangers. One approach has been to employ small clip-on plastic members to identify the size. However, these clip-on members have added to the cost of the product. Additionally, the small clip-on members require considerable manual dexterity and can be accidentally knocked off during transit or storage. Another option has been to apply adhesive labels to the panels on these hangers. However, the adhesive labels have been manually applied with corresponding time and cost penalties. Furthermore, the small adhesive labels have been difficult to handle and properly position on the small panels of the hangers. Available labeling machines have been unacceptable because they are primarily intended to apply the labels to a relatively large sturdy surface. The known labeling machines would be unacceptable to apply a small label to a small angularly aligned panel on a structurally weak hook of a plastic hanger. Furthermore, available labeling machines would require careful manual positioning, thereby offering few if any advantages over purely manual application of labels.

In view of the above, it is an object of the subject invention to provide an apparatus for efficiently placing labels on a clothing hanger.

It is another object of the subject invention to provide an automatic labeling apparatus for placing size labels on the hook portion of a clothing hanger.

A further object of the subject invention is to provide a labeling apparatus to place size labels on angularly aligned panels of a plastic clothing hanger.

An additional object of the subject invention is to provide a labeling apparatus that is adjustable with respect to the angle of the surface to which the label will be applied.

A further object of the subject invention is to provide a labeling apparatus that can be incorporated into an apparatus for advancing the hangers and clothing thereon to appropriate racks for shipping and storage.

SUMMARY OF THE INVENTION

The subject invention is directed to an apparatus for automatically placing a label on a clothing hanger. More particularly, the apparatus is uniquely adapted to place an adhesive backed label on a planar surface on the hanger. Typically, the planar surface will be on the hook portion of a plastic hanger.

The apparatus may comprise clamping means to securely position the clothing hanger relative to a fixed frame of reference. The clamping means may further be operative to securely but releasably hold selected portions of a fragile plastic hanger hook while the label is being applied to the clothing hanger. The apparatus may further comprise label positioning means for positioning a label in proximity to a selected location on the hanger. The label positioning means may further be operative to grasp the label from a supply of labels and move the label into proximity to the selected location on the hanger. The apparatus of the subject invention may further comprise applicator means for applying the properly positioned label to the selected location on the hanger. The applicator means may comprise first and second portions which are independently operable and which cooperate with the label positioning means. Once the label has been properly applied in its preselected location, the hanger may be removed from the apparatus thereby placing the apparatus in condition to receive the next sequential hanger to be labeled.

In a preferred embodiment, the supply of labels will comprise a cassette having a carrier tape therein to which adhesively backed labels are removably secured. The label positioning means may be operative to selectively remove a label from the carrier tape stored in the cassette. More particularly, the cassette may be operative to wind the carrier tape therein around a relatively small roller in a manner to cause the labels to sequentially become partly separated therefrom. This can be achieved by forming the labels out of a material that is less pliable than the carrier tape to which the labels are releasably secured. Thus, the labels will not follow the carrier tape around the small roller, but will continue in a tangential direction to a location where they can be grasped sequentially by the positioning means. The cassette bearing the tape and labels may be removably mounted in the apparatus to enable replacement of the cassette when the supply of labels is exhausted or when it is necessary to change labels for a particular job requirement.

The apparatus may further include control means to selectively coordinate the advancement of the carrier tape in the cassette with each successive actuation of the label positioning means. More particularly, the control means may be operative to advance the tape a preselected amount to place the next available label in a location to be received by the label positioning means. Similarly, the label positioning means may be actuated by the control means immediately after the selected advancement of the tape in the cassette. The control means may further coordinate the actions of the label applicator means with the actions of the label positioning means. Thus, the label applicator means may be actuated by the control means after the label positioning means has moved a controlled amount to align the label engaged thereby with the selected location on the hanger. The label applicator means may then advance toward the hanger to securely urge at least a portion of the label against the selected location on the hanger. In the typical situation, the labels will be adhesively backed. As a result, the pressure applied by the label applicator means will adhesively secure the label to the selected location on the hanger. The control means may further be operative to cause the label positioning means to disengage from the label after a portion of the label has been urged against the hanger. The label positioning means may then move away from the hanger permitting the application of the remainder of the label. The hanger positioning means may then move away from the hanger, thereby permitting the hanger to be removed from the apparatus.

The apparatus may further comprise actuating means which may be triggered by the employee operating the apparatus. Alternatively, the apparatus may be actuated automatically by a hanger urged against at least a portion of the hanger clamping means.

As noted above, the surface of the hanger to which the size labels are attached may be angularly aligned with respect to the elongated garment supporting portion of the hanger. The particular angular alignment may vary somewhat from one hanger manufacturer to the next. The subject apparatus preferably is constructed such that the label applicator means moves generally orthogonal to the surface on which the hanger is to be applied. Additionally, the apparatus preferably is constructed such that the label positioning means moves generally parallel to the surface on which the hanger is to be applied. The label positioning means and the label applicator means may be adjustable within the apparatus to accommodate hangers of different constructions.

The apparatus of the subject invention may be employed to merely place labels on hangers. In this typical situation, the employee placing a garment on a hanger will sequentially insert the hanger with the garment thereon into the labeling apparatus for application of the appropriate size label. The employee will then manually advance the hanger and garment to a rack for storage and/or shipping. The rack typically will be positioned in close proximity to the labeling apparatus. In certain embodiments, the labeling apparatus may be incorporated into means for guiding the hanger onto the garment rack. In these situations the employee may merely place the hanger and garment supported thereon into position in the labeling apparatus. The hanger may then be retained by the clamping means of the apparatus while the label is being applied thereto. Once the label has been applied, the clamping means may release the hanger and permit the hanger to drop and/or slide onto an appropriate rack for storage and shipment.

DETAILED DESCRIPTION OF THE PREFERRED EMBODIMENT

Figure 1:
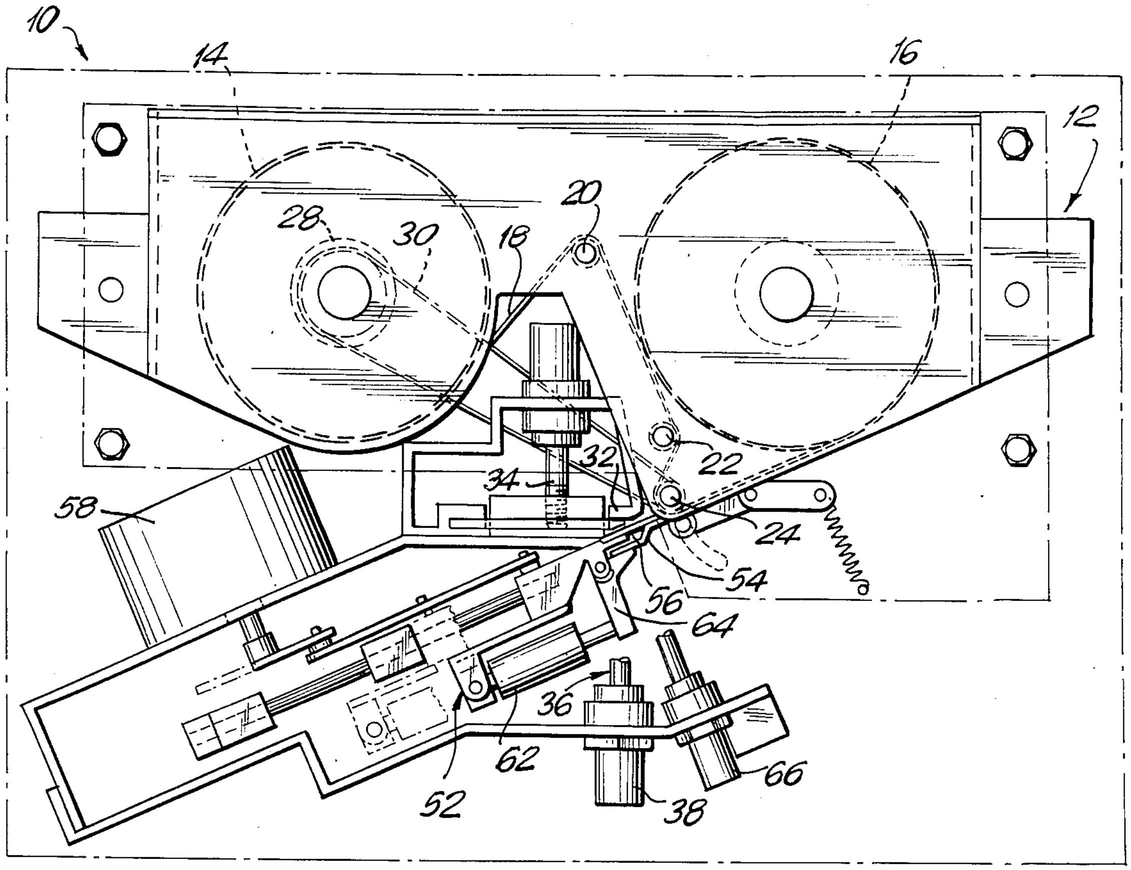
FIG. 1 is a top plan view of the labeling apparatus of the subject invention.

The labeling apparatus of the subject invention is indicated generally by the numeral 10 in FIG. 1. The apparatus 10 is constructed to receive a replaceable cassette 12 having a take-up reel 14 and a feed reel 16 between which a carrier tape 18 is wound. The carrier tape 18 has a plurality of spaced apart labels removably attached thereto. The cassette 12 is provided with rollers 20, 22 and 24 disposed therein to guide the carrier tape between feed reel 16 and take-up reel 14. The rollers 22 and 24 are disposed relative to the feed reel 16 such that the carrier tap 18 defines an acute angle substantially around roller 24. As will be explained below, the roller 24 defines a pickup position in the apparatus 10.

The labeling apparatus 10 further includes a motor 28 disposed to engage the take-up reel 14 on cassette 12. More particularly, the motor 28 is operative to exert a rotational force on take-up reel 14 in a direction to advance the carrier tape 18 from the feed reel 16 to the take-up reel 14. In this particular embodiment, the apparatus is further provided with a belt 30 connecting the motor 28 to the roller 24 to cause a portion of the forces on the carrier tape 18 to be exerted at roller 24. In this embodiment, the motor 28 is a continuously operable friction motor which generates forces which are not sufficient to advance the carrier tape 18. However, the carrier tape 18 will advance by a pulling force exerted on the individual labels, as explained further below. In other embodiments, the motor 28 may alternately stop and start with each label application.

The labeling apparatus 10 further comprises a hanger alignment frame 32 against which the hook of a garment hanger may be securely positioned. The hanger alignment frame 32 is constructed to provide a substantially immovable surface configured to accept the profile of a particular garment hanger hook. The labeling apparatus 10 is further provided with an actuator switch 34 which is operative to sense the presence of a hanger against the frame 32, and to trigger the operation of the labeling apparatus 10 as explained herein.

Figure 3:
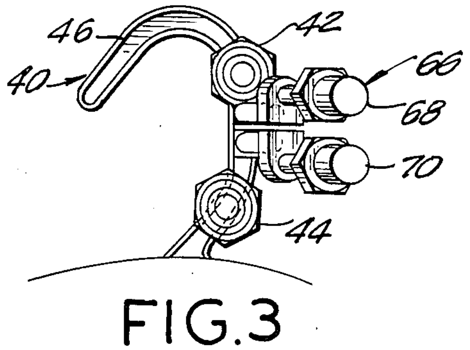
FIG. 3 is a front elevational view showing the clamping means and label applicator of the subject apparatus.

The labeling apparatus 10 is further provided with a hanger clamp 36 which is operative to urge selected portions of the hanger hook against the hanger alignment frame 34. The hanger clamp 36 includes an actuator 38 which is operative to selectively move portions of the clamp 36 toward and away from the hanger alignment frame 34. More particularly, the hanger clamp 36 is operative to securely retain a hanger 40 against the hanger alignment frame 34. The hanger clamp 36 comprises clamping members 42 and 44 which, as shown in FIG. 3, engage the hook portion 46 on opposite sides of the label panel 50 thereof. This selective clamping of the hanger hook 46 against the hanger alignment frame 34 will ensure the proper positioning of the hanger 40 for receiving a label as explained below, and will prevent damage to the hanger hook 46 during the labeling operation.

Figure 2:
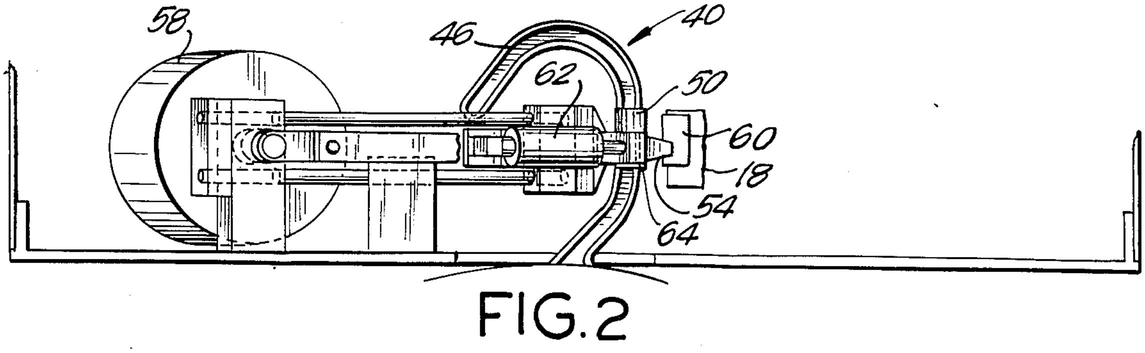
FIG. 2 is a front elevational view showing the label positioning means of the labeling apparatus.

The labeling apparatus 10 further comprises a tweezer assembly 52 as shown in FIGS. 1 and 2. The tweezer assembly 52 includes a pair of gripping tongs 54 and 56 which are movable in unison along a line generally parallel to the plane of label panel 50 on hanger 40. More particularly, the gripping tongs 54 and 56 of the tweezer assembly 52 are powered by a motor 58 to move between various operative positions relative to the hanger 40 as explained herein. The gripping tongs 54 and 56 are also movable toward and away from one another to enable selective gripping and release of labels 60. The movement of the gripping tongs 54 and 56 relative to one another is effected by the piston assembly 62 which is operatively connected to the tong 54 through linkage 64. As shown most clearly in FIG. 2, the tongs 54 and 56 are operative to grip the label 60 approximately adjacent one half of the leading edge of the label 60.

The labeling apparatus 10 further includes a label applicator assembly 66 which, as shown most clearly in FIG. 3, includes first and second label applicators 68 and 70. The label applicators 68 and 70 are operative to move generally orthogonal to the plane of the label panel 50 on hanger 40 and to securely urge a label 60 against the label panel 50. However, the lable applicators 68 and 70 are independently movable relative to one another, and their respective movements are coordinated with respect to the operation of the tweezer assembly 52.

Figure 4:
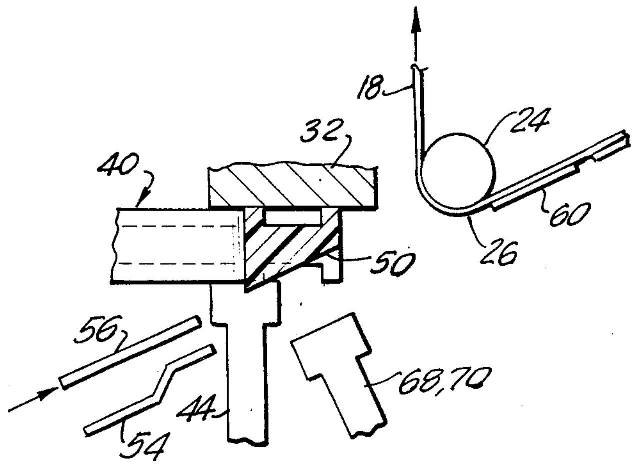
FIG. 4 is a top plan view schematically showing the labeling apparatus in a first operational condition.

The operation of the labeling apparatus 10 is illustrated in FIGS. 4–7. More particularly, as shown in FIG. 4, the hanger 40 is positioned in the apparatus 10 such that the hook portion 46 thereof is disposed against the alignment frame 32. The positioning of the hanger 40 relative to the alignment frame 32 will trigger the actuator switch 34, as shown in FIG. 1, causing the hanger clamp 36 to securely urge the hanger 40 against the alignment frame 32. At this point in the operation, the label applicators 68 and 70 and the tweezer tongs 54 and 56 will be spaced from the label panel 50. Additionally, the label 60 will be disposed on carrier tape 18 in proximity to the pickup position defined by roller 24.

Figure 5:
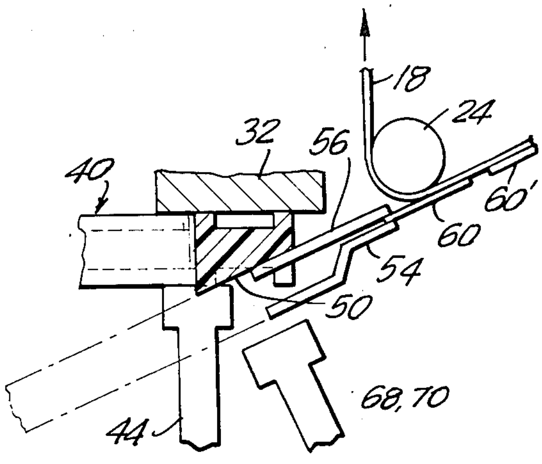
FIG. 5 is a top plan view schematically showing the labeling apparatus in a second operational position.

Once the hanger 40 has been securely retained against the alignment frame 32 by the hanger clamp 44, the tweezer tongs 54 and 56 will advance generally parallel to the plane of label panel 50 and toward the pickup position 26. During this movement, the tweezer tongs 54 and 56 will be spaced from one another as shown most clearly in FIG. 4. The spaced apart tweezer tongs 54 and 56 will advance around opposite sides of the label 60 and then will be urged toward one another, as shown in FIG. 5 to securely grasp the label 60. The tweezer tongs 54 and 56 will then begin moving away from the roller 24 and toward the label panel 50. This movement of the tweezer tongs 54 and 56 while gripping the label 60 will contribute to the advancing forces on carrier tape 18, thereby contributing to the feeding of the carrier tape 15 from the feed reel 16 to the take-up reel 14.

Figure 6:
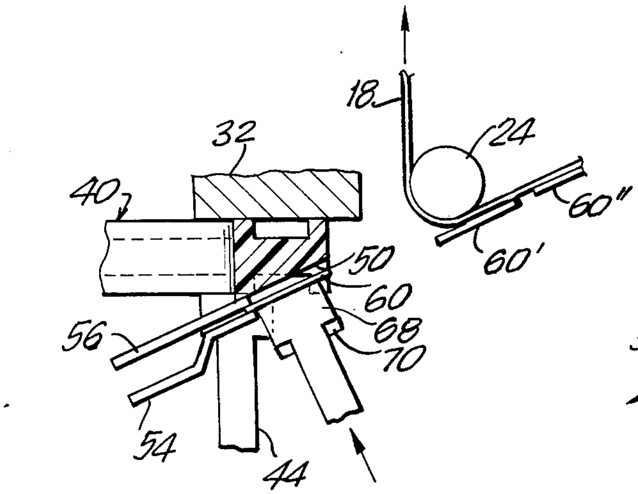
FIG. 6 is a top plan view schematically showing the labeling apparatus in a third operational condition.
Figure 7:
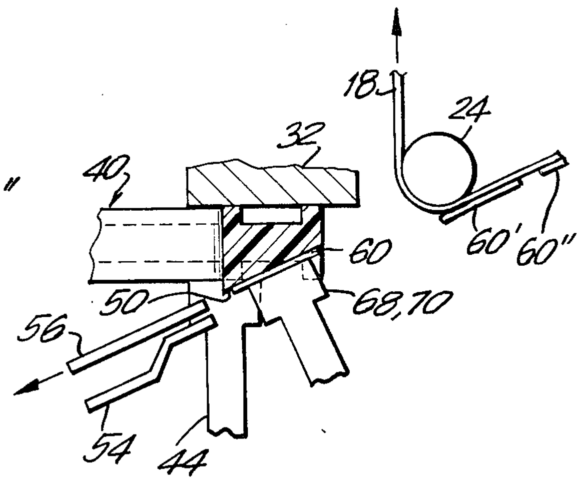
FIG. 7 is a top plan view schematically showing the labeling apparatus in a fourth operational position.

The tweezer tongs 54 and 56 pull the label 60 from the carrier tape 18 and into alignment with the label panel 50 on hanger 40. Once the tweezer tongs 54 and 56 have moved the label 60 into proper alignment relative to the label panel 50, the first label applicator 68 advances to urge approximately one half of label 60 toward and against the label panel 50. As shown in FIG. 6, at this point in the operation, the tweezer tongs 54 and 56 still grip the remaining half of the leading edge of label 60. Additionally, at this point in the operation, as shown in FIG. 6, the second applicator 70 is still spaced from the label 60. After the first applicator 68 has secured a portion of the label 60 to the label panel 50, the tweezer tong 54 will move away from tweezer tong 56, thereby releasing the grip on label 60. The tweezer tongs 54 and 56 will then continue in their movement toward their starting position and away from the roller 24. Upon release of the label 60 by the tweezer tongs 54 and 56, the second applicator 70 will move toward label panel 50 to urge the remainder of label 60 into secure attachment to the label panel 50, as shown in FIG. 7. The label applicators 68 and 70 will then retract into the positions shown in FIGS. 4 and 5, and the clamps 42, 44 will then also retract to permit the hanger 40 to be removed from the labeling apparatus 10 and permitting the labeling apparatus 10 to receive the next hanger 40 upon which label 60' will be placed.

As noted above, the labeling apparatus 10 preferably is positioned in proximity to a rack from which hangers 40 may be suspended. In certain embodiments, the labeling apparatus 10 and the hanger rack may be disposed relative to one another such that the hanger is dropped directly onto the rack upon release of the clamps 42 and 44. Also as noted above, the preferred embodiment of the labeling apparatus 10 provides for automatic actuation upon positioning of a hanger 40 relative to the alignment frame 32. In alternate embodiments, the actuation may be carried out by the operator of the apparatus. In all embodiments, however, it is anticipated that a complete cycle of the labeling apparatus 10 will be carried out very quickly, and preferably in approximately 2 seconds or less.

In summary, a labeling apparatus is provided for applying labels, such as size tags, to a panel on a garment hanger. The apparatus is constructed to receive a cassette having feed and take-up reels between which a carrier tape moves. A plurality of spaced apart size labels are removably disposed on the carrier tape. The apparatus further comprises an alignment frame against which a selected portion of the hanger may be positioned. Once the hanger is in position, a clamp is actuated to securely retain the hanger against the alignment frame. A tweezer assembly then removes a label from the carrier tape and positions the label in proximity to the selected location on the hanger. A first applicator then urges a portion of the label into contact with the selected location on the hanger. Once this portion of the label is secured to the hanger, the tweezer assembly releases its grip on the label and a second applicator urges the remainder of the label into secure contact with the hanger. The applicators and the clamp are then retracted allowing the hanger to be removed from the apparatus.

While the invention has been described with respect to certain preferred embodiments, it is understood that various changes to those embodiments can be made without departing from the scope of the invention as defined by the appended claims.

What is claimed is:

1. An apparatus for applying a label to a planar panel of a garment hanger, said apparatus comprising:

a supply of adhesively backed labels removably mounted on a carrier tape, said supply further comprising a cassette replaceably mounted in said apparatus, said cassette comprising a feed reel and a take-up reel rotatably mounted in said cassette and between which said carrier tape is movable, each said label on said carrier tape comprising first and second portions at generally opposed ends of said label;

an alignment frame securely mounted to said apparatus and configured to receive portions of said hanger adjacent the planar panel thereof;

a clamp selectively movable to urge portions of said hanger adjacent said planar panel securely against the alignment frame;

drive means operatively connected to said cassette for sequentially advancing the carrier tape from the feed reel to the take-up reel;

a tweezer assembly selectively translatable toward and away from said label supply and generally parallel to the planar panel of said hanger, said tweezer assembly comprising a pair of opposed tongs selectively movable toward and away from one another for securely gripping the second portion of said label therebetween;

first applicator means for urging the first portion of a label moved into proximity with the hanger by the tweezer assembly into contact with the planar panel of the hanger secured to the alignment frame by the clamp; and second applicator means for urging the second portion of said label into contact with the clamped planar panel of the hanger, whereby the second applicator means is operative to urge the second portion of the label into contact with the securely clamped hanger after the first portion of the label is secured to the hanger and after the label positioning means has released the label.

2. An apparatus as in claim 1 further comprising actuator means for actuating the label positioning means and the label applicator means.

3. An apparatus as in claim 1 further comprising actuator means for sensing the presence of a hanger in said apparatus and for actuating said apparatus in response to said sensed presence of said hanger.

4. An apparatus as in claim 1 wherein the means for sequentially advancing labels from said supply comprises means for driving the pickup reel of the cassette.

5. An apparatus as in claim 4 wherein the means for driving said pickup reel comprises a friction motor.

* * * * *